United States Patent
Cheng et al.

(10) Patent No.: US 7,913,963 B2
(45) Date of Patent: Mar. 29, 2011

(54) DEVICE STAND WITH SUCTION BASE

(75) Inventors: Gang Cheng, Shenzhen (CN);
Meng-Hua He, Shenzhen (CN);
Chun-Che Yen, Taipei Hsien (TW);
Yu-Tao Chen, Taipei Hsien (TW);
Te-Sheng Jan, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 174 days.

(21) Appl. No.: 12/427,705

(22) Filed: Apr. 21, 2009

(65) Prior Publication Data

US 2010/0044535 A1 Feb. 25, 2010

(30) Foreign Application Priority Data

Aug. 22, 2008 (CN) .......................... 2008 1 0304154

(51) Int. Cl.
*A45D 42/14* (2006.01)
(52) U.S. Cl. .................... 248/205.5; 248/206.2; 248/363
(58) Field of Classification Search ............... 248/176.1, 248/205.2, 205.6, 205.7, 205.8, 206.2, 309.1, 248/309.3, 311.2, 363
See application file for complete search history.

(56) References Cited

U.S. PATENT DOCUMENTS

| 5,685,661 | A | 11/1997 | Marka et al. |
| 6,932,306 | B2 * | 8/2005 | Zou et al. .................... 248/205.5 |
| 7,226,026 | B2 * | 6/2007 | Lin .............................. 248/205.5 |
| 7,469,868 | B2 * | 12/2008 | Bury ........................... 248/205.8 |
| 7,475,860 | B2 * | 1/2009 | Chien et al. .................... 248/363 |
| 7,537,190 | B2 * | 5/2009 | Fan .............................. 248/309.1 |
| 7,661,648 | B2 * | 2/2010 | Lin .............................. 248/683 |
| 7,712,720 | B1 * | 5/2010 | Cheng et al. ............. 248/346.07 |
| 7,850,133 | B2 * | 12/2010 | Carnevali ................... 248/205.5 |

FOREIGN PATENT DOCUMENTS

| CN | 1142578 A | 2/1997 |
| CN | 201025277 Y | 2/2008 |

* cited by examiner

*Primary Examiner* — Gwendolyn Baxter
(74) *Attorney, Agent, or Firm* — Zhigang Ma

(57) ABSTRACT

A device stand includes a suction base and a load-supporting module mounted on the suction base. The suction base includes a suction piece, a fixing structure, a face cam, pins, and a fixing cap. The fixing structure, configured for fitting over the suction piece, includes a shaft housing and a sleeve extending upwardly from the shaft housing. The sleeve defines axial running slots. The face cam fit over the sleeve of the fixing structure. One end of each of the pins engages with the face of the face cam, the other end of each of the pins passes through the axial running slots of the sleeve and connects with the shaft of the suction piece. The fixing cap is mounted on an upper end of the sleeve. The stand can be fixed to/taken off from a flat surface easily.

10 Claims, 7 Drawing Sheets

DEVICE STAND WITH SUCTION BASE

BACKGROUND

1. Technical Field

The present disclosure relates to a device stand with a suction base.

2. Description of Related Art

A motor vehicle may include a stand for supporting a mini computer, a mobile navigation apparatus, or a mobile phone. The stand is usually fixed on a surface inside the motor vehicle with fasteners or adhesive and cannot be easily moved if necessary.

What is needed is a stand that can be easily relocated.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
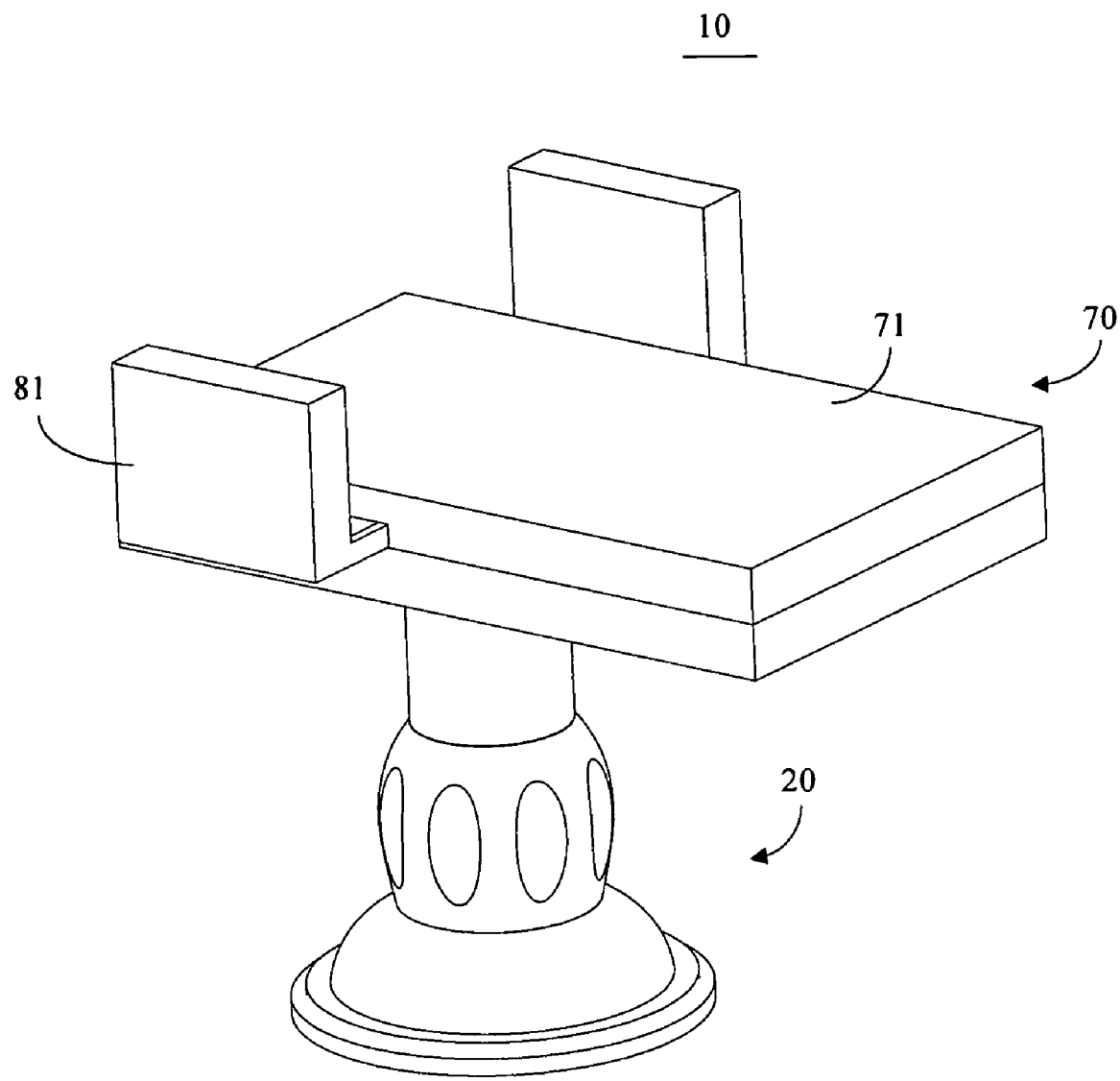
FIG. 1 is a schematic, isometric view of a stand according to an exemplary embodiment, the stand including a suction base and a load-supporting module.

Referring to FIG. 1, a stand 10 according to an exemplary embodiment is disclosed. The stand 10 includes a suction base 20 and a load-supporting module 70 mounted on top of the suction base 20.

Figure 2:
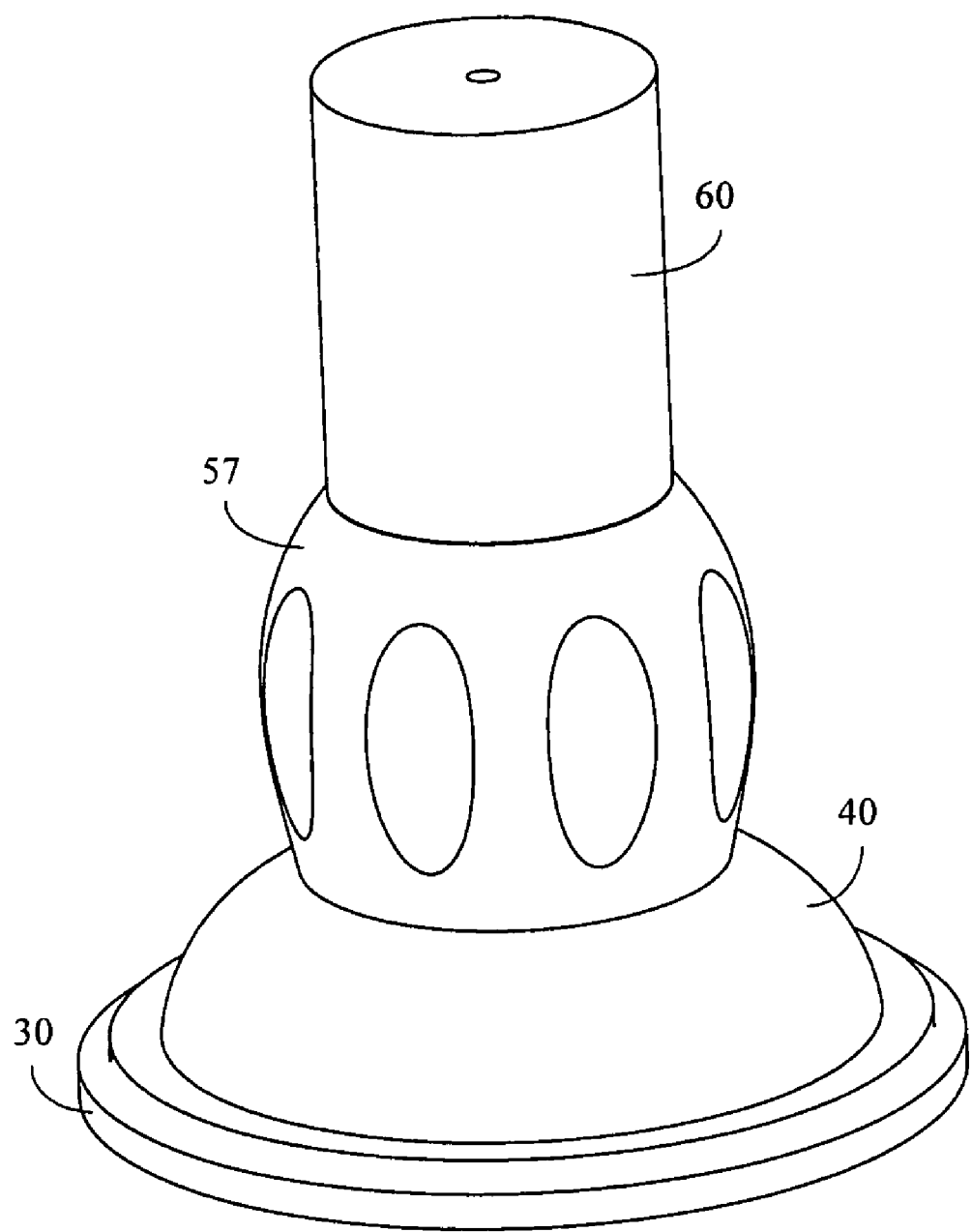
FIG. 2 is a schematic, isometric view of the suction base of FIG. 1.
Figure 3:
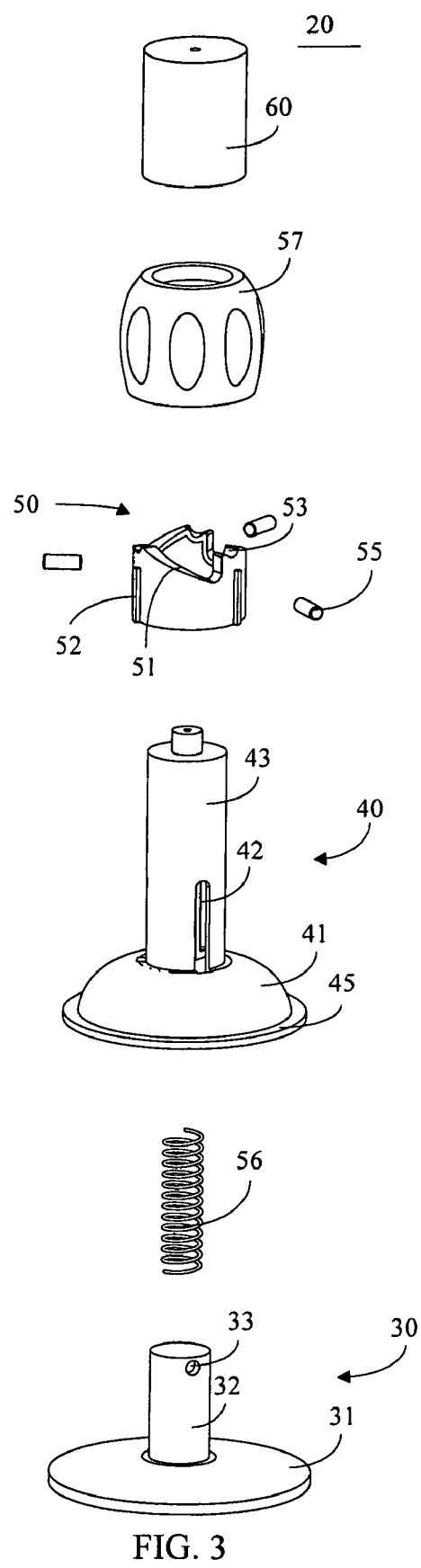
FIG. 3 is an exploded view of the suction base of FIG. 2.
Figure 4:
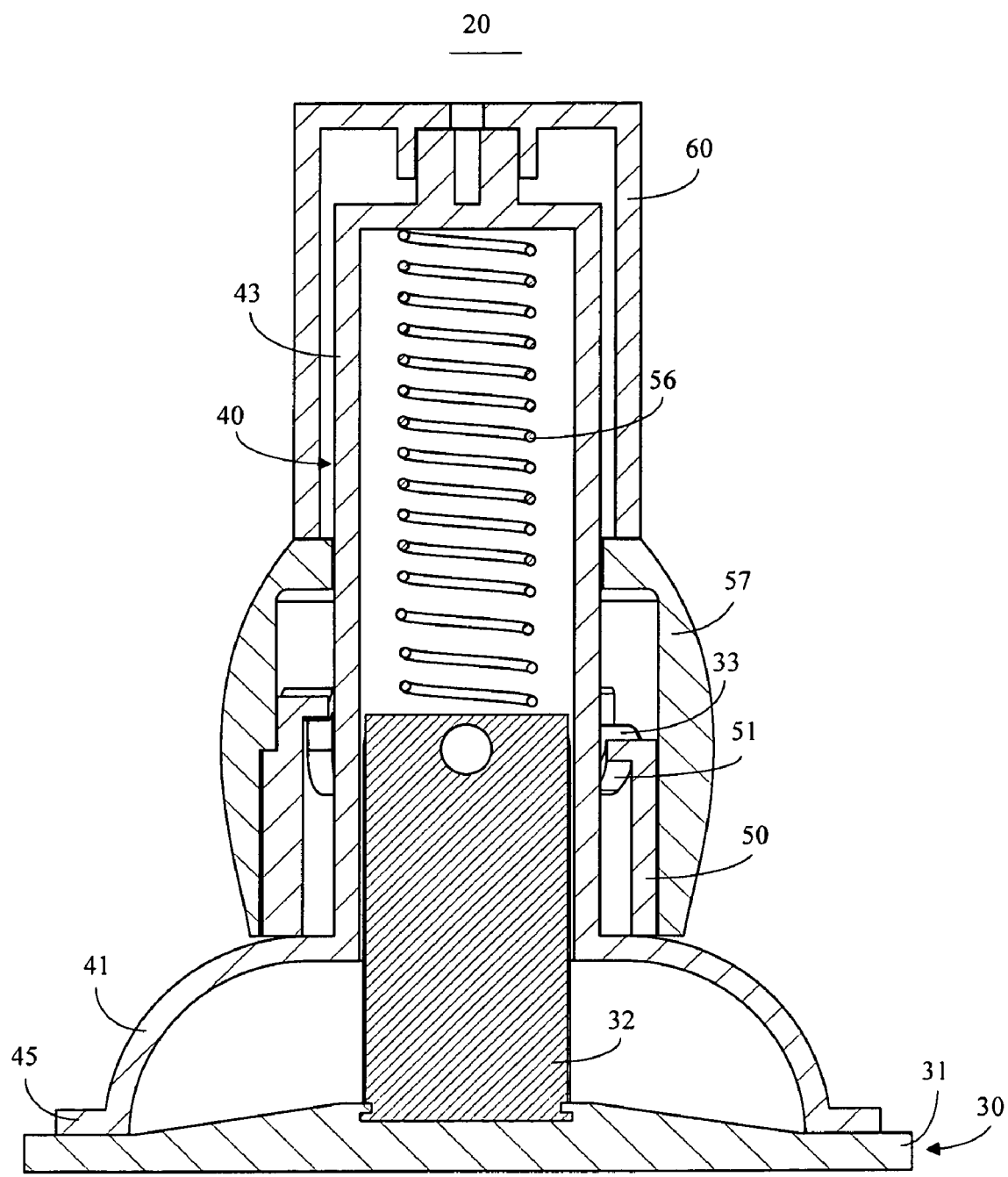
FIG. 4 is a section view of the suction base of FIG. 2 without a vacuum seal created.

Referring to FIGS. 2, 3 and 4, the suction base 20 includes a suction piece 30, a spring 56, a fixing structure 40 for fitting over the suction piece 30, pins 55, a face cam 50, a rotatable sleeve 57, and a fixing cap 60.

The suction piece 30 includes a membrane 31 and a shaft 32 extending upwardly from the membrane 31.

The fixing structure 40 includes a shaft housing 41 and a sleeve 43 extending upwardly from the shaft housing 41, and lower edge of the housing 41 forms a flange 45. The sleeve 43 defines axial running slots 42. An upper end of the sleeve 43 is closed.

The face cam 50 is ring-shaped and has a face 51 which includes grooves 53 defined therein. The face cam 50 further includes axial rails 52 projected from an outer circumferential surface thereof.

During assembly of the suction base 20, first, the sleeve 43 receives the spring 56, then is fit over the shaft 32. The spring 56 is positioned between the upper end of the sleeve 43 and the shaft 32. Second, the face cam 50 is fit over the sleeve 43. One end of each of the pins 55 engages with the face 51 of the face cam 55. The other end of each of the pins 55 extends through the running slots 42 defined in the sleeve 43 and enters into holes 33 defined in the shaft 32. Third, the rotatable sleeve 57 fits over the face cam 50, and grooves (not shown) defined in an inner surface of the rotatable sleeve 57 engage with the rails 52 of the face cam 50, thus to connect the rotatable sleeve 57 to the face cam 50. Finally, the fixing cap 60 is fixed to the upper end of the sleeve 43 by screws (not shown).

Figure 5:
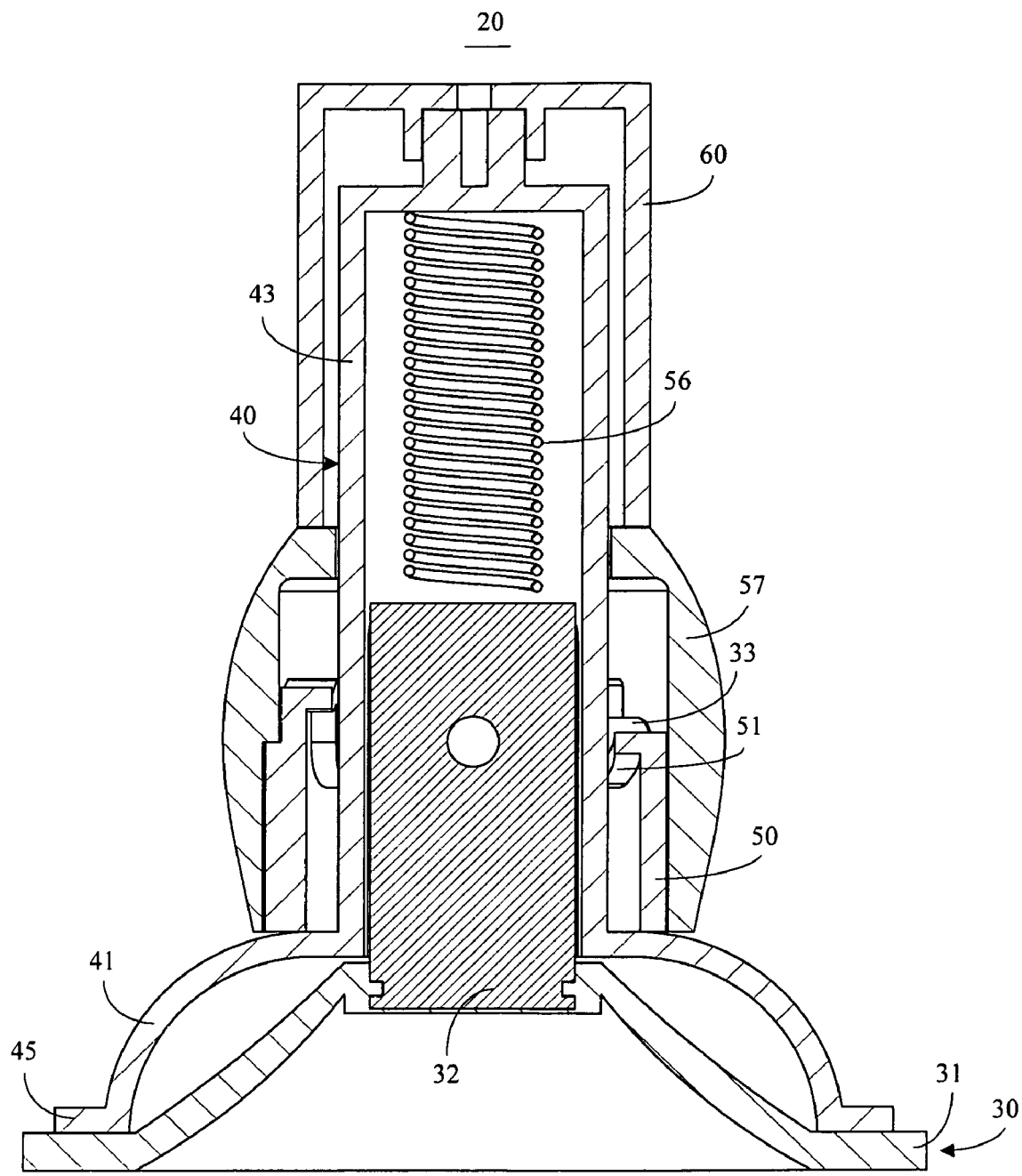
FIG. 5 is a section view of the suction base of FIG. 2 with a vacuum seal created.

Referring to FIGS. 4 and 5, in use, the suction base 20 is put on a flat surface, such as a window, ensuring the membrane 31 is flush against the surface, the pins 55 are initially at a lowest position on the face 51. Then, the rotatable sleeve 57 is grasped and rotated, while holding the base 20 against the surface. During rotation of the sleeve 57, which causes the face cam 50 to rotate, the pins 55 are driven along the face 51 until engaging in the grooves 53. Meanwhile, the shaft 32, driven to move up by the pins 55, pulls only a central portion of the membrane 31 away from the contacting surface, as the edge of the membrane 31 is limited by the flange 45 of the shaft housing 41, forming a vacuum seal between the membrane 31 and the contact surface. In this way, the suction base 20 is fixed on the surface.

The suction base 20 can be easily removed from the flat surface by rotating the rotatable sleeve 57. In this way, the membrane 31 is driven to move down, the vacuum between the membrane 31 and the surface of the flat surface is eliminated, and the suction base 20 is no longer fixed on the flat surface.

Figure 6:
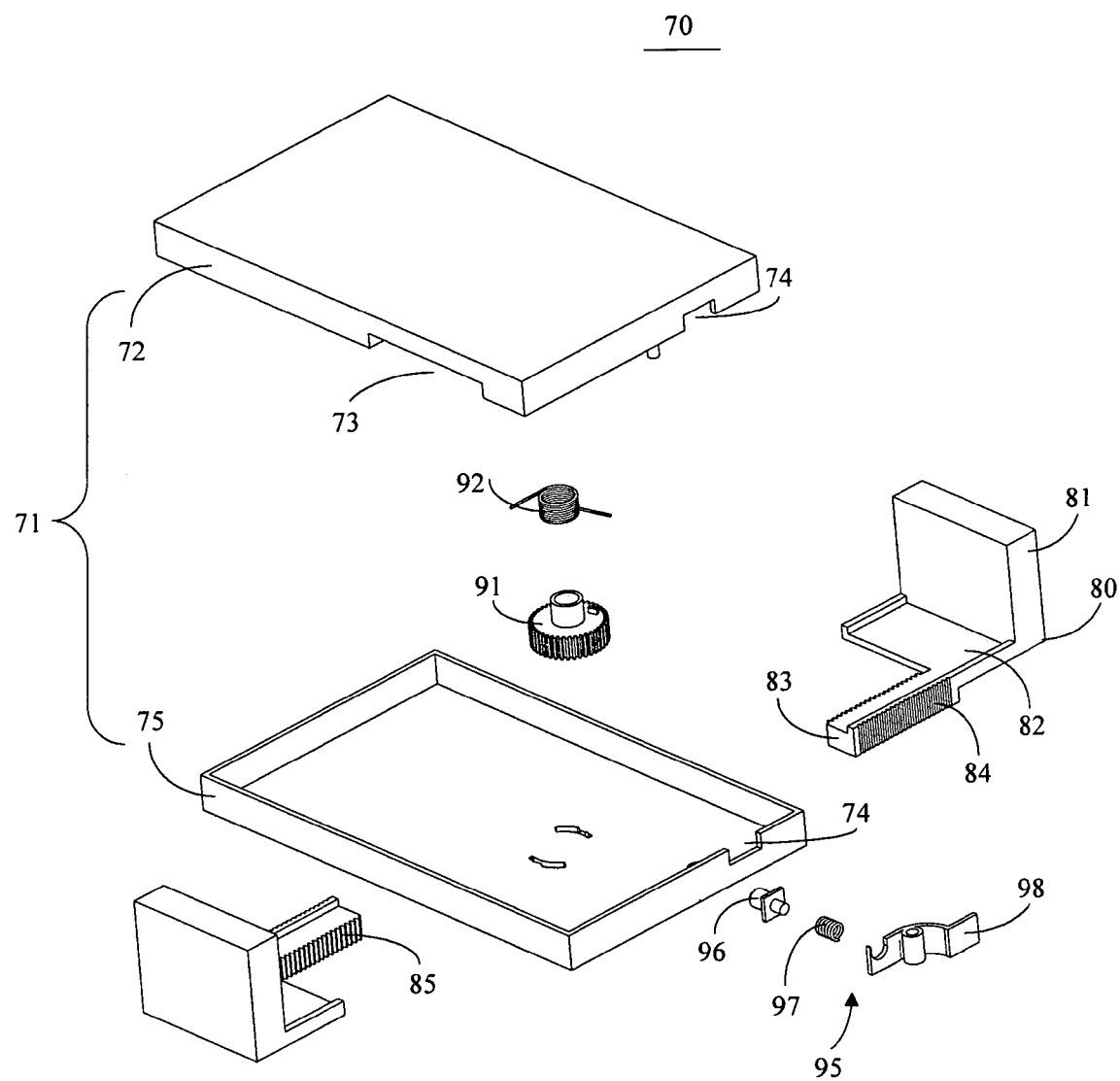
FIG. 6 is a exploded view of the load-supporting module of FIG. 1.
Figure 7:
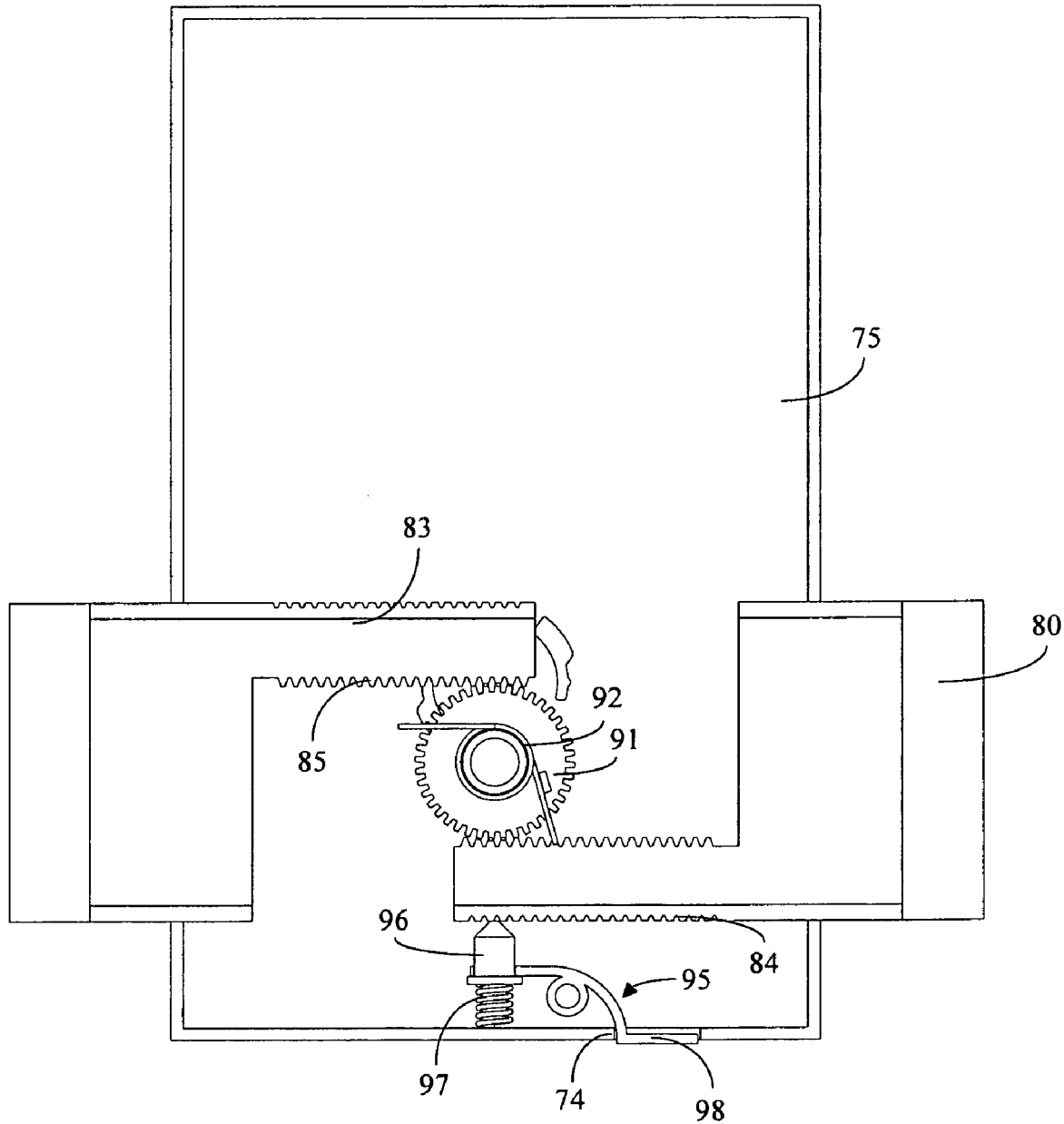
FIG. 7 is a top plan view of the load-supporting module of FIG. 1, with a top cover removed.

Referring to FIGS. 6 and 7, the load-supporting module 70 includes a housing 71 to house a pair of clamps 80, a gear 91, a torsion spring 92, and a locking structure 95.

The housing 71 is rectangle shaped, and includes a top cover 72 and a bottom cover 75. The top cover 72 defines grooves 73 therein.

The clamps 80 are L-shaped, and includes vertical parts 81 and horizontal parts 82. The horizontal parts 82 include rack gears 83. The rack gears 83 define a plurality of locking grooves 84 on outer sidewalls thereof. The horizontal parts 82 are received by the grooves 73 of the top cover 72. Referring to FIG. 1, the vertical parts 81 extend upwardly from the housing 71.

The gear 91 is rotatably mounted in the housing 71 and meshes with the rack gears 83 respectively. The torsion spring 92 fits over a shaft of the gear 91. The torsion spring 92 causes the gear 91 to rotate, and causes the clamps 80 to mesh with the gear 91 to move away from each other.

The locking structure 95 is used to lock the clamps 80 and thus to fix the clamps 80 at a position, or to unlock the clamps 80 to allow the clamps 80 to move.

In the exemplary embodiment, the locking structure 95 includes a locking pin 96, a spring 97, and an elastic piece 98. The locking pin 96 is slidably mounted in the housing 71. The spring 97 fits over the locking pin 96 and causes the locking pin 96 to engage with a locking groove 84 of the clamp 80, thus to lock the clamps 80. The elastic piece 98 is rotatably mounted in the housing 71. One end of the elastic piece 98 is fixed with the locking pin 96. The other end of the elastic piece 98 stays in an opening 74 of the housing 71. When the elastic piece 98 receives a pressure at the opening 74, the elastic piece 98 causes the locking pin 96 to move away from the locking groove 84, thus to unlock the clamps 80.

Referring also to FIG. 1, when loading, a device is placed on the housing 71. The clamps 80 are pushed to move towards each other and clamp the device. The locking structure 95 locks the clamps 80. In this way, the device is fixed on the load-supporting module 70. When unloading, the elastic piece 98 of the locking structure 95 is pressed down and the clamps 80 are unlocked. The torsion spring 92 causes the clamps 80 to move away from each other. Then the device can be unloaded from the load-supporting module 70.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A device stand comprising:
    a suction base comprising:
        a suction piece comprising a membrane and a shaft extending upwardly from the membrane;
        a fixing structure configured for fitting over the suction piece, comprising a shaft housing and a sleeve extending upwardly from the shaft housing, wherein the sleeve defines at least one axial running slot;
        a face cam fitting over the sleeve of the fixing structure and defining a face thereon;
        at least one pin, wherein one end of each pin engages with the face of the face cam, the other end of each of the pins passes through one of the at least one axial running slot of the sleeve and connects with the shaft of the suction piece; and
        a fixing cap mounted on an upper end of the sleeve; and
    a load-supporting module mounted on the suction base.

2. The device stand of claim 1, wherein the face comprises depressed grooves on an upper end thereof for engaging with the at least one pin.

3. The device stand of claim 1, further comprising a rotatable sleeve fitting over the face cam, configured for driving the face cam to rotate.

4. The device stand of claim 1, wherein an upper end of the sleeve is closed.

5. The device stand of claim 4, further comprising a spring disposed between the upper end of the sleeve and the shaft.

6. A suction base of a device stand, the suction base comprising:
    a suction piece comprising a membrane and a shaft extending upwardly from the membrane;
    a fixing structure configured for fitting over the suction piece, comprising a shaft housing and a sleeve extending upwardly from the shaft housing, wherein the sleeve defines a plurality of axial running slots;
    a face cam fitting over the sleeve of the fixing structure and defining a face thereon;
    a plurality of pins, wherein one end of each of the pins engages with the face of the face cam, the other end of each of the pins passes through one of the plurality of axial running slots of the sleeve and connects with the shaft of the suction piece; and
    a fixing cap mounted on an upper end of the sleeve.

7. The suction base of claim 6, wherein the face comprises depressed grooves on an upper end thereof for engaging with the plurality of pins.

8. The suction base of claim 6, further comprising a rotatable sleeve fitting over the face cam, configured for driving the face cam to rotate.

9. The suction base of claim 6, wherein an upper end of the sleeve is closed.

10. The suction base of claim 9, further comprising a spring disposed between the upper end of the sleeve and the shaft.

* * * * *